United States Patent

Eddy

[15] 3,678,208

[45] July 18, 1972

[54] MARKER PATH FINDING ARRANGEMENT INCLUDING IMMEDIATE RING

[72] Inventor: John W. Eddy, Villa Park, Ill.

[73] Assignee: GTE Automatic Electric Laboratories Incorporated, Northlake, Ill.

[22] Filed: April 12, 1971

[21] Appl. No.: 133,114

[52] U.S. Cl. ....................179/18 GE
[51] Int. Cl. ....................H04q 3/42
[58] Field of Search ....................179/18 GE

[56] References Cited

UNITED STATES PATENTS 3,293,368 12/1966 Wedmore ....................179/18 GE

*Primary Examiner*—Kathleen H. Claffy
*Assistant Examiner*—William A. Helvestine
*Attorney*—K. Mullerheim, B. E. Franz and Theodore C. Jay, Jr.

[57] ABSTRACT

The disclosure relates to an arrangement in a marker pathfinding scheme for providing immediate ringing of the called subscriber terminal. The terminating junctors available to a called terminal are divided into groups with each group receiving the ringing current in a different time period. Each ringing period is preceded by an enabling pulse such that the marker in its pathfinding operation tests first those terminating junctors corresponding to the then occurring enabling pulse.

8 Claims, 5 Drawing Figures

INVENTOR
JOHN W. EDDY

BY Bernard E. Franz
ATTORNEY

MARKER PATH FINDING ARRANGEMENT INCLUDING IMMEDIATE RING

BACKGROUND OF THE INVENTION

1. Field of the Invention

This invention relates to a telephone switching system marker, and more particularly, to an arrangement within such marker for causing the expeditious application of ringing current to a called telephone.

2. Description of the Prior Art

Ringing arrangements of prior art systems are exemplified by the disclosure of U.S. Pat. No. 3,293,368. The terminating junctor there disclosed has the interrupted ringing generator output brought to a group of contacts operable by relays controlled from a common source for application to the called line conductors. The ringing generator output would be connected to all of the terminating junctors in parallel, were it not for the consideration of the ringing cycle which nominally consists of a 2 second application of the ringing current followed by a 4 second off period, and the loading imposed by this cycle upon the ringing generator and the associated interrupted contacts. The ringing generator output is conveniently divided in three ringing groups with a 6 second cycle time. The terminating junctors are accordingly divided into three groups each corresponding to its associated ringing period. The marker in selecting a terminating junctor does not take the ringing period into consideration; it is chosen only upon a consideration of its availability in the selected path. Therefore a connection to a called line may be completed at a time when the ringing period is just about to end, has already ended or is just beginning. Obviously the latter condition is most desirable since this decreases the overall time required for completion of the connection. Schemes developed in the past to overcome these deficiencies have included an additional relay in each junctor to give a "splash" of ringing whether it was needed or not. Such schemes had the disadvantage of higher cost and depending upon the point in time during which seizure occurs, will cause "rings" of irregular intervals. In a multifrequency ringing system the cost of such an arrangement becomes prohibitive.

SUMMARY OF THE INVENTION

Accordingly it is an object of this invention to provide a marker pathfinding arrangement that will reduce the holding time of the equipment prior to ringing the called party. The function of the marker in the path selection operation is to find an idle path from a specific selector inlet to a specific line inlet. This path includes three stages of the selector matrix, a terminating junctor and three stages of the line matrix. The terminating junctor is required since it is the circuit having a central access to both the calling and called parties for ring back and ringing application to the lines as well as the battery feed equipment. The marker tests the links of the line matrices from the called line terminal to the terminating junctors for their availability. For each path found the marker attempts to apply an idle test potential to the accessible terminating junctors. This operation however cannot be completed to all of the terminating junctors that are accessible, but is conditioned upon the terminating junctors having an appropriate ringing period. There are a maximum of 120 terminating junctors that could be enabled, but in view of their association with the three particular ringing periods discussed only 40 would be initially enabled for the path testing operation if they were equally divided. This division is not normally true since the junctors are arranged in groups of six, therefore the groups enabled would consist of 42, 42 and 36 junctors.

The enabling potential goes through a normally closed relay contact in the terminating junctor to the terminating junctors idle test lead on the selector matrix side of the junctor. If the terminating junctor is busy, the contact is open, so the potential is not available for a path selection through the selector matrix. The marker thus applies a potential to each terminating junctor which has an idle path from it through the three line matrix stages to the line inlet. Some or all of these junctors are wired to a known group of outlets on the desired selector matrix. The marker then scans the possible combinations of the selector matrix links and the idle test leads. If the marker finds an idle combination, it is known that this combination represents an idle path from the selector inlet to the line inlet and that the called party will be rung immediately upon the path being completed thereto.

The marker has then to build a "tree" to the selector matrix outlet as defined by the position of the scanner. This provides a connection to apply ground to operate the selector matrix crosspoints. The marker also applies a ground to the idle test lead of the selected path; this operates a relay in the junctor which completes a connection from the marker through the selected terminating junctor to the line matrix outlet to which the junctor is wired. This connection is used to apply the ground potential to operate the matrix crosspoint reed relays.

DESCRIPTION OF THE PREFERRED EMBODIMENT

Marker Call Processing With Ring Phase Control

Figure 1:
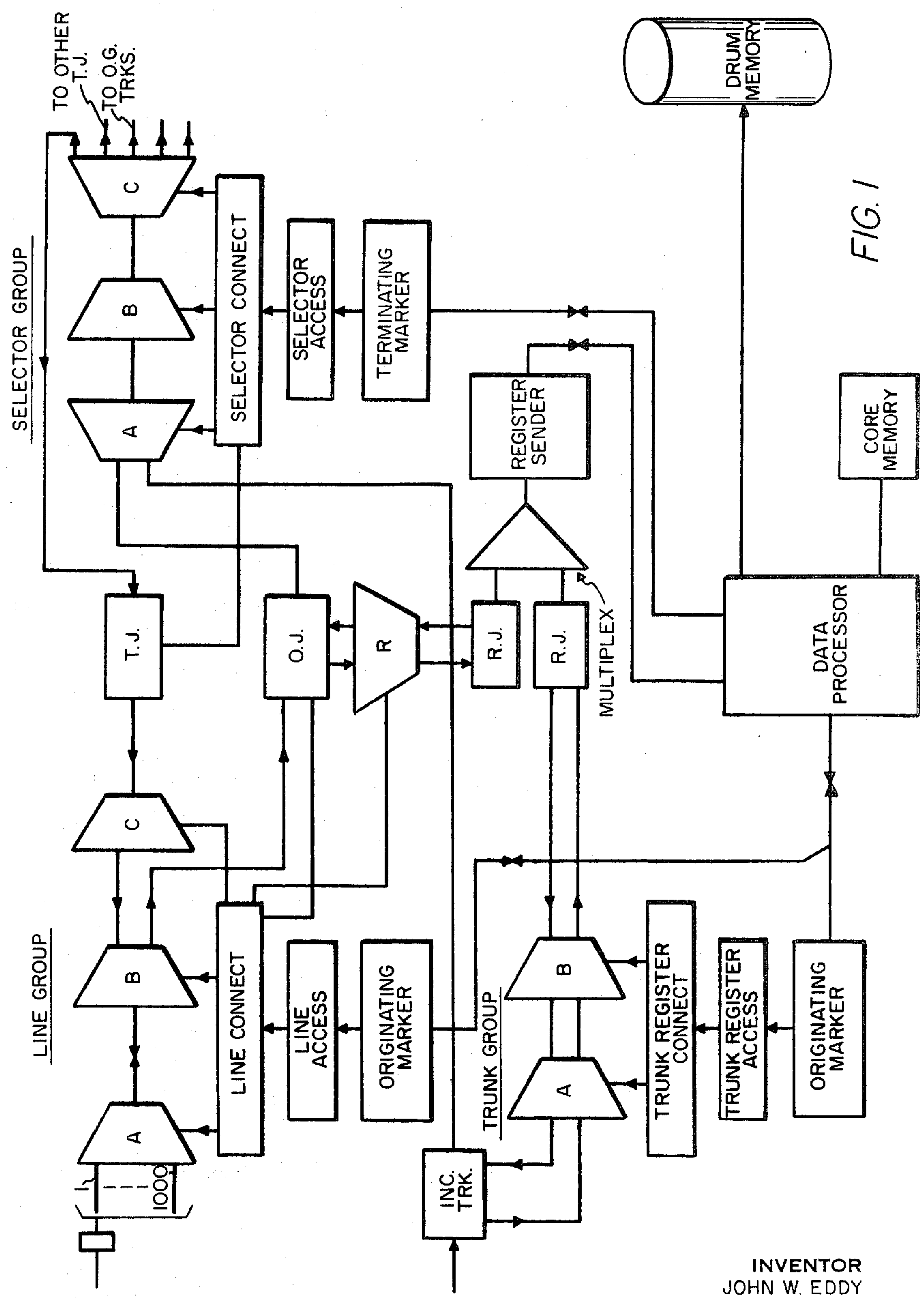
FIG. 1 is a block diagram of a telephone switching exchange incorporating the novel features of this application.

The block of information received from the data processor unit, FIG. 1 contains the selector group inlet information, the originating junctor associated with the calling party, the selector matrix, selector AB group, selector A unit, and selector A unit inlet. Also, this block of information contains selector group outlet information associated with the local called party such as horizontal, C group, array, plus bight, and sequential scan. Since the call is to terminate at a local line, the block of information will include the identity of the line matrix, line AB group, line A unit, and line A unit inlet associated with the called party. Acting on the block of information received from the data processor unit, the terminating marker completes the call to a local line by establishing a path through the selector matrix, an idle terminating junctor, and through the line matrix to the local line.

Terminating Path Selection

The terminating marker has to be in an idle state in order to receive a call for service from the data processor unit. The data processor unit determines which terminating marker is idle and able to serve a call, then transmit a call for service to the chosen marker.

The data processor will send to the terminating marker via the marker's communication transceiver a block of information consisting of the instruction and data needed for the call to be established. The terminating marker decodes this block of information to determine whether the call is to an outgoing trunk or whether the call shall be extended through a line group to a local line.

Figure 2:
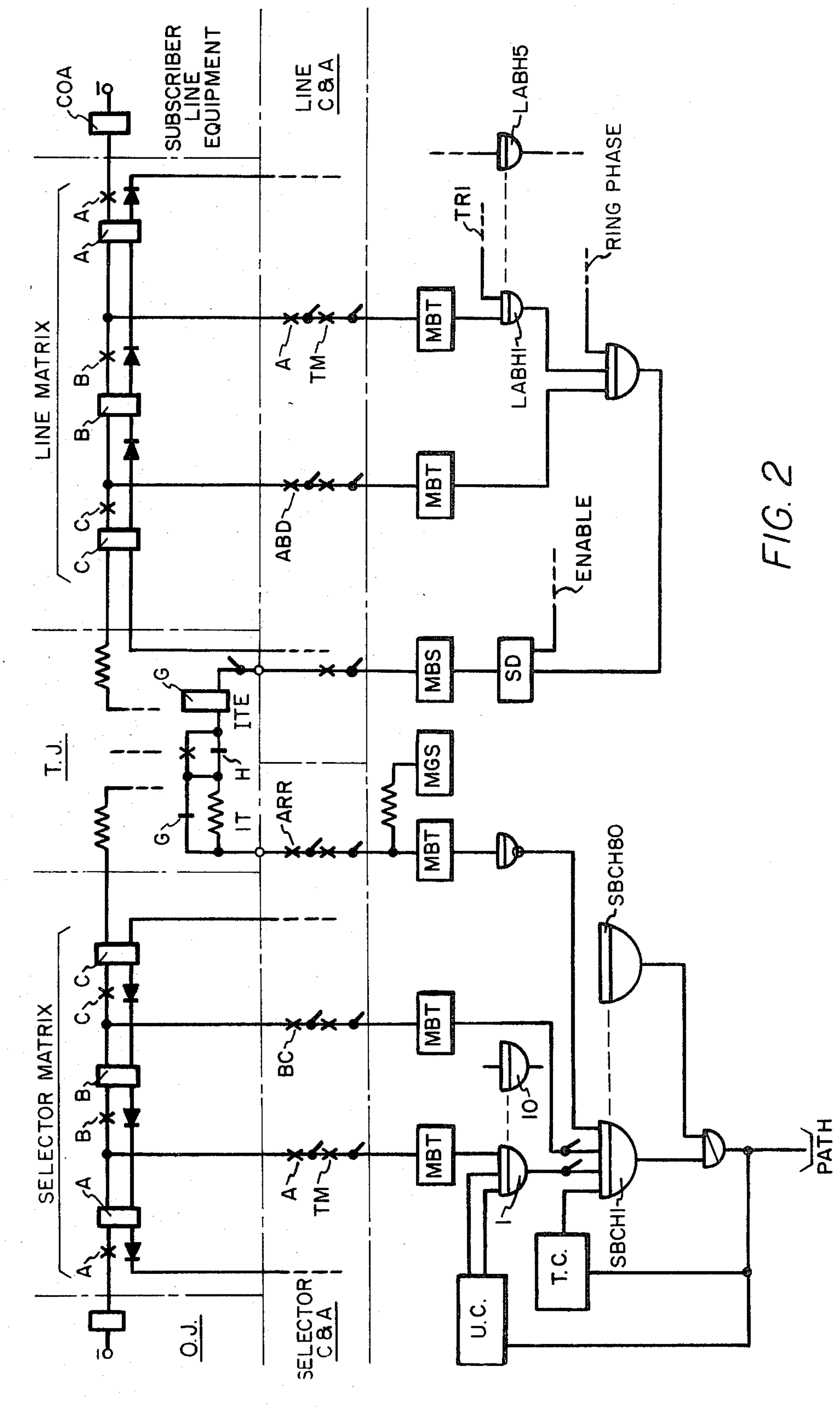
FIG. 2 is an abstracted diagram showing the essential elements of the selector and line matrices and the associated path selection logic.

On a call to a local line, the marker tests the appropriate line matrix to determine if an originating marker has already accessed it. When the terminating marker determines that the line matrix is idle, it makes this line matrix busy to prevent one of the originating markers from accessing this line matrix. The terminating marker operates selector and line access equipment to gain access to the appropriate selector group and line group. The terminating marker then operates line and selector connect equipment to connect itself to the line group, AB group, A card, A unit inlet, and terminating junctor group as shown in FIG. 2. The line group AB links and the line group A unit inlet are checked for busy.

The information as to the relays to be operated to reach the proper terminal is contained in the data received from the central processor to the marker communication transceiver. This information also includes information necessary to connect to the five line matrix AB links available to this line terminal. The 20 BC links available to the AB links are also connected according to the data received from the data processor unit.

Figure 5:
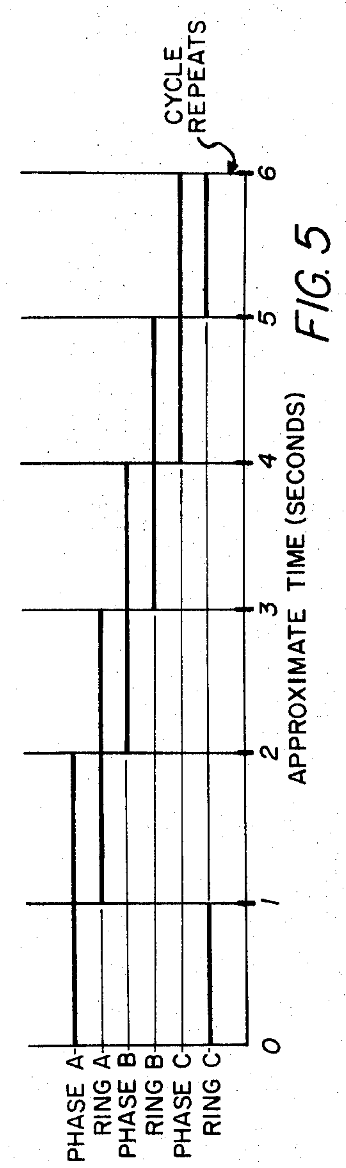
FIG. 5 is a chart showing the ringing selection pulse timing relative to the associated ringing periods.
Figure 4:
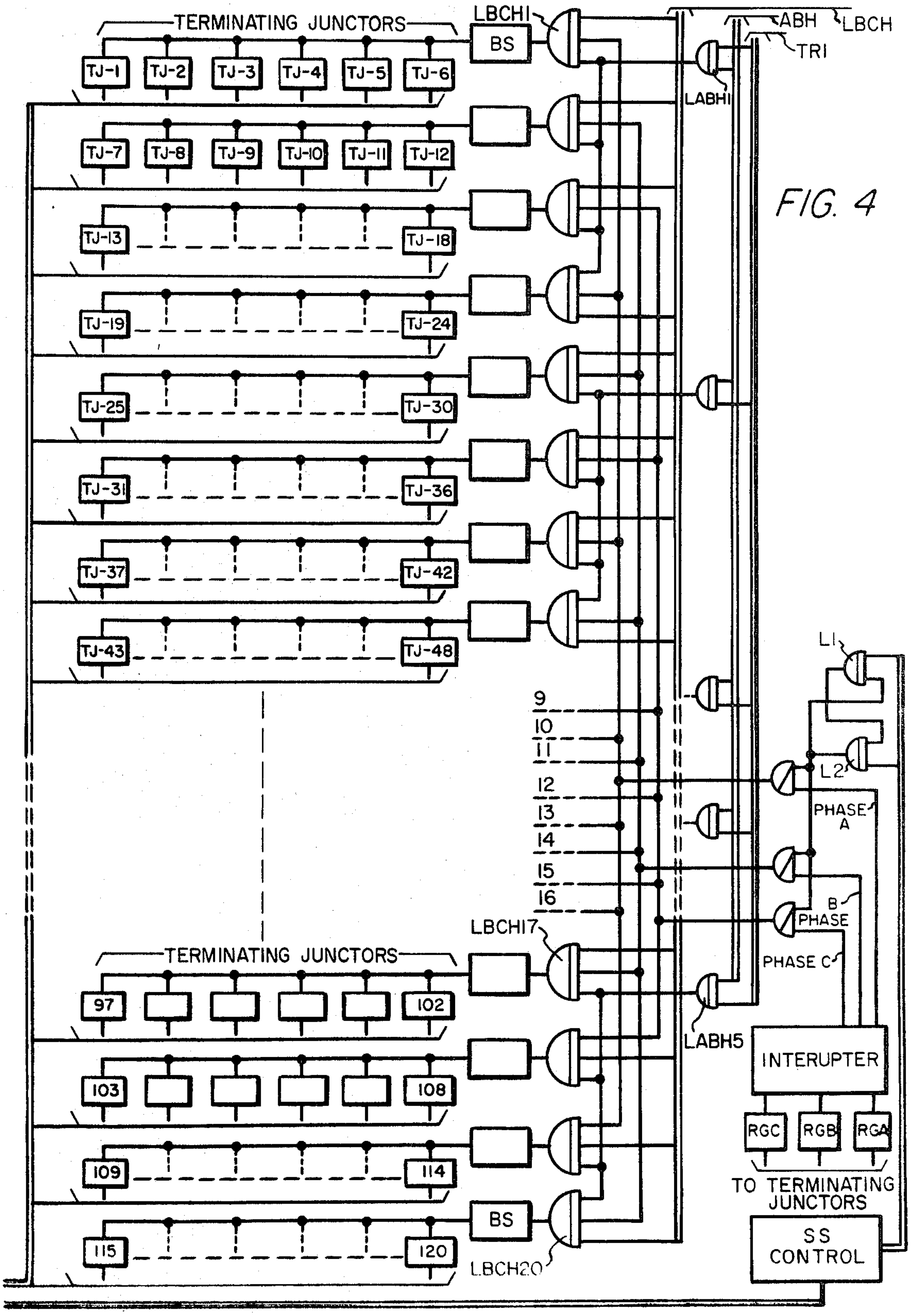

Each of the leads from the five AB link hold conductors are taken through the connect and access circuits to one of five AND gates such as gates LABH1–5 along with an enabling lead, TR1 from the transceiver; see FIG. 4. The output of each of these gates LABH1–20 is connected to four AND gates LBCH1–20 out of a total of 20 corresponding to the four BC links available to each of the AB links. If all five of the AB links as well as all 20 of the BC links were available then all 120 terminating junctors would have an idle test enabling potential applied to them. But at this point as can be seen by referring to FIG. 4 an additional factor is injected. None of the AND gates LBCH1–20 will be enabled without the presence of a signal from the interrupter shown by a box labeled TNT. This interrupter places a two second enabling pulse upon each of the three leads labeled phase A, phase B and phase C in succession. Therefore only one third of the 20 gates LBCH1–20 will be enabled at one time. These pulses are shown on the chart of FIG. 5 where it can be seen that each 2 second pulse precedes the ringing signal supplied to the terminating junctors by 1 second. The interrupter also supplies the operating current pulses to the three ringing generators to turn them on at the proper times so that upon completion of the path finding operation and the path pulling operation the ringing current is applied to the called line. The outputs of these 20 gates are each connected to a battery switch SDBS1–20. Each of these battery switches is then connected to a group of six terminating junctors. Therefore each terminating junctor of the group to which there is a path available from the selected line terminal and has the proper ringing phase connected to it has a battery potential applied to its idle test enabling lead. If the junctor is idle this potential is passed through it to the idle test lead of the selector path testing circuit. If the called line is busy and a connection cannot be made, the connect and access circuit paths established are dropped, and a data frame is sent to the data processor unit for the terminating marker. As a result, the busy signal is returned to the calling party.

If the A unit inlet in the line group is idle and the access and connect circuitry from the marker to both the line group and selector group is complete, a scan is made for an idle path through the selector group to the common group of terminating junctors associated with the idle path through the line group.

Figure 3:
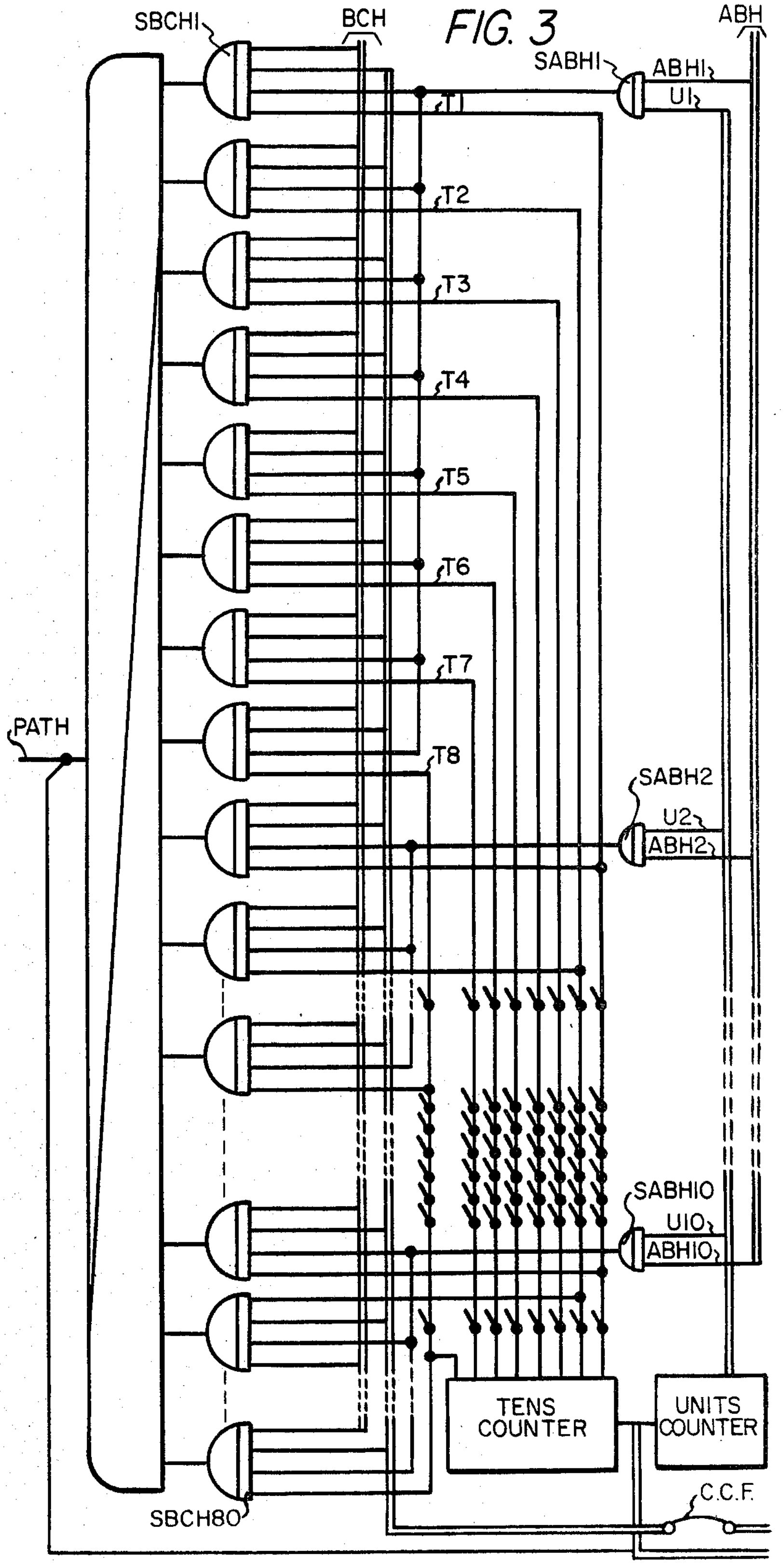
FIGS. 3 and 4 when placed side by side show the path selection circuitry including the instant ringing feature.

The originating junctor to which the calling line is connected is accessed in accord with the information provided the marker by the data processor. The connect and access circuits are then operated by the inlet control to connect the 10 AB links of the selector matrix to the marker outlet control. These 10 links are the AB links available to the originating junctor as outlets of the A matrix horizontal to which the originating junctor is connected as illustrated by FIGS. 2 and 3. The 10 hold leads corresponding to the 10 links are each taken to an AND gate SABH1–10, to which is also connected another input from a units counter.

These 10 AB links fan out into 80 potentially available BC links. These 80 leads from the hold conductors of the BC links are each taken to an AND gate SBCH1–80. These 80 gates may be visualized as 10 groups of eight gates, then each group of eight gates corresponds to and has connected in multiple thereto as an input a lead corresponding to one of the 10 AB links associated therewith. Also, each gate of each group has one input corresponding to the tens counter outputs 1 through 8. One other input to each of the 80 gates is the idle test output IT from the terminating junctors through which a called line may be reached, only a maximum of 80 are tested at a time and this amount is further decreased by the ringing period groupings initially. The result of these link connections is that as the tens scanner enables a group of 10 gates, the units scanner will look at each of these gates in succession. Then if the gate enabled by both the units and tens scanner also has an available AB link, an available BC link, and an idle junctor, the output of the gate is passed through an OR gate to indicate a selector path found. This stops the scanners, and their status indicates the junctor selected.

Once a path through the selector matrix, terminating junctor and line matrix is found, the circuit is pulled, the called subscriber station is rung after which the talking path is established. Necessary data concerning the established path is sent to the data processor unit via the terminating marker's communication transceiver. The terminating marker disconnects from the line and selector matrices by releasing the associated connect and access equipment. The terminating marker returns to its idle state and is ready to process other calls. In either type of call, trunk or local, the terminating marker releases the path through the connect and access circuitry. Since the line matrix was made busy, on a call to a local line it is now made idle to other markers, both originating and terminating. The terminating marker's communication transceiver sends the identity of the path selected to the data processor unit. Should the marker be unable to find a path with the initially selected ringing group, the absence of a signal on the "Path" lead and an indication of a full scan being completed from the tens and units counters to the sequence control SS will cause the sequence control to set the latch made up of gates L1 and L2 to enable all three ringing period groups of the terminating markers after which a new path finding operation is attempted.

Tracing a Local Call Through the System

When a subscriber goes off-hook, the line loop is closed, causing the line correed of his line circuit to be operated. Refer to FIG. 1. Energizing the line correed places a call for service through the line matrix A, B, and C stages to the originating marker. This is accomplished by marking the inlet pull lead with resistance battery, via the break contacts of the call-for-service correed and the make contacts of the line correed. Reference may be had to U.S. Pat. No. 3,211,837 for a detailed description of the line identifier.

The originating marker assigners are sequentially scanning line and trunk matrices. They sense the resistance battery on the outlet pull leads of the selected line matrix C units and begin to set up the call. One of the two markers will be assigned to the call when the line matrix number coincides with the scanner count; provided one of the markers is idle, the selected line matrix has no marker presently assigned to it, and no terminating marker is waiting for this matrix.

The assigned originating marker connects to the line matrix by operating marker dedicated access correeds in the line matrix. These correeds attach the marker to the matrix group in order to allow the necessary marker-matrix communication for the processing of the call to take place. It then attempts to set up the call by connecting the subscriber's line through the line matrix to an idle originating junctor O.J. and an idle register junctor R.J. The cycle time is in milliseconds. The marker scans the inlet pull leads of the selected C unit in the line matrix to identify the AB group (200 lines see FIG. 2) from which the call originated. The marker then operates connect correeds which access the identified AB group. The A unit (20 lines) is identified in the same manner, except that the B unit inlets are scanned, and the marker then operates the connect correeds corresponding to the identified A unit. A scan of the inlet P leads of the A unit identifies the line calling for service.

From the inlet identity, the marker determines which AB links are accessible from this inlet and tests these links for busy. All outlets of B units connecting to unaccessible or busy AB links are electronically inhibited from route selection. The marker then determines if all register junctors connected to any R unit are busy and electronically inhibits the associated B unit outlets from route selection.

The remaining B unit outlets constitute idle links to originating junctors. The marker selects one of these links by scanning until it detects an idle link. The market then scans the outlets of the R unit defined by the B unit outlet, and makes a register junctor selection.

At this point, the marker has identified the calling line number (line matrix number, AB group number, A unit, and A unit inlet), and has preselected an idle path identified in terms of the B unit, B unit outlet, and R unit outlet. This information is loaded into the marker communication register and sent to the data processor unit via its communication transceiver.

While sending the line number identity and route data to the data processor, the marker operates connect correeds which provide access to the selected B unit and R unit outlets. These outlets and the inlet calling for service define a unique matrix path from inlet to register junctor. The path is tested dynamically for the existence of multiple crosspoints as disclosed in the U.S. Pat. application, Ser. No. 53,354 of J. P. Mills filed July 9, 1970. The A, B and R crosspoints are pulled. A temporary hold is applied by the marker to the hold lead at the R matrix outlet and the path is tested for foreign potentials as disclosed in the U.S. Pat. application, Ser. No. 99,935 of T. Gartner and H. W. Van Husen filed Dec. 21, 1970. The marker hold is repeated by the originating junctor, operating the subscriber's line circuit cut-off correeds. This removes the line correed from the line loop and busies the inlet to terminating calls. The pull is then removed to check the ability of the network to hold.

The marker operates the register junctor hold correed, which connects the register junctor pulsing relay to the loop. The hold correed provides a hold potential for the path and the marker's temporary hold is removed. The subscriber's loop seizes the register junctor pulsing correed. The pulsing correed operates, indicating presence of a pulsing highway to the register controller of the register-sender. Upon detecting the pulsing highway, the register sets up a hold in the register junctor. The marker, after observing that the register junctor is busy and the network is holding, disconnects itself from the matrix. The entire marker operation takes a few milliseconds.

The data processor unit, upon being informed of a call origination, enters the originating phase. The originating phase is one of the three major phases of the call processing function, and can best be defined as all program functions that are performed from the time the originating marker informs the data processor of an originating call until the register-sender is initialized to receive the incoming digital information.

As previously stated, the block of information sent by the marker includes the equipment identity of the originator, originating junctor and register junctor, plus control and status information. The control and status information is used by the data processor control program in selecting the proper function to be performed on the data frame.

The data processor analyzes the data frame sent to it, and from it determines the register junctor identity. A register junctor translation is required because there is no direct relationship between the register junctor identity as found by the marker and the actual register junctor identity. The register junctor number specifies a unique cell of storage in the memory.

Once the register junctor identity is known, the data is stored in the data processor's call history table, and the register-sender is notified that an origination has been processed to the specified register junctor.

Following the register junctor translation, the data processor performs a class-of-service-translation. The class-of-service translation is needed because different inlets on the line matrix require different services by the system. Included in the class-of-service is information concerning dial tone, party test, coin test, type of ready-to-receive signaling required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from the memory the originating class-of-service data keyed on the originator's line number identity. Part of the class-of-service information is stored in the call history table in the data processor unit, and part of it is transferred to the register-sender where it is used to control the register junctor.

Before the transfer of data to the register-sender memory takes place, the class-of-service information is first analyzed to see if the special action is required (e.g., non-dial line or blocked originations). The register junctor is informed of any special services the call it is handling must have. This is accomplished by the data processor loading the results of the class-of-service translation into the register-sender memory words associated with the register junctor.

The register junctor returns dial tone and the customer proceeds to key touch calling telephone sets or dial the directory number of the desired party.

The register junctor pulse repeating correed follows the incoming pulses (dial pulse call assumed), and repeats them to the register-sender central control circuit via a lead multiplex. The accumulated digits are stored in the register-sender memory.

In this example, a local line without special features is assumed. The register-sender requests a translation after collecting the first three digits. At this point, the data processor enters the second major phase of the call processing function — the digit analysis phase.

The digit analysis phase includes all functions that are performed on incoming digits in order to provide a route for the terminating process phase of the call processing functions. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described, the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. The data processor initiates a request to the memory system for a look-up of the local directory number table (terminating lists) to provide the line equipment number of the called line and terminating class of service of the called line (including ringing code and special features). Grouping digits (selector outlet arrays) for the terminating junctors are obtained from a memory table look-up keyed on the terminating line matrix. The data processor also requests the memory system to determine the selector matrix inlet identity. This information is assembled in the dedicated call history table in the data processor memory. Control is transferred to the terminating process phase. The digit analysis phase is complete.

The terminating process phase is the final major phase of the call processing function. Sufficient information is gathered to instruct the terminating marker to establish a path from the selector matrix inlet to either a terminating local line (this example) or a trunk group. See FIG. 1. This information plus control information (e.g. ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the operation as the data frame is sent to the terminating marker. The call is forwarded to the called party, and the call is terminated.

A check is made of the idle state of the data processor communication register, and a terminating marker. If both are idle, the data processor writes into the register-sender memory that this register is working with a terminating marker. All routing information is then loaded into the communication register and sent to the terminating marker in a serial communication.

The terminating marker decodes the line matrix specified for line termination, determines that the matrix is idle (no originating marker processing it) and assigns itself to the matrix. The terminating marker connects to the specified line and selector matrices by operating dedicated access correeds in the respective matrices. It then operates connect correeds accessing the selector inlet, selector AB and BC links, line AB and BC links, and the line circuit of the called line.

The marker checks the called line to see if it is idle. If it is idle, the marker continues its operations. These operations include the path selection, the pulling and holding of a connection from the originating junctor to the called line via the selector matrix, a terminating junctor and the line matrix. The terminating junctor is here selected on the basis of the ringing period it has available for the called subscriber at the time of the completion of the path as described in detail in the preceding section. While controlling the path, the marker makes a series of checks to monitor the proper operation of the matrices, e.g., links are tested for busy, paths are pulled and checked for foreign potentials, and the complete path from selector inlet to the line circuit is checked for continuity.

When the operation of the matrices has been verified by the marker, it informs the data processor of the identity of the path and that the connection has been established. The marker then releases from the path. The data processor recognizes from the terminating class that no further extension of this call is required. It then addresses the register-sender memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its associated memory and releases itself from the call.

The calling party, now connected to the terminating junctor loop, seizes the battery-feed correed. The terminating junctor splits the transmission path and connects ringing current to the called line and ring-back tone to the calling line. When the called party answers, a closed loop is detected by the ring-trip circuit of the terminating junctor, which removes ringing and ring-back tone from the line. The transmission path is completed and transmission battery is provided to both calling and called parties.

When the parties are through talking and hang up, the terminating junctor releases the terminating line matrix and the selector matrix. Release of the selector matrix releases the originating junctor which releases the originating line matrix. The cut-off correeds of both line circuits release, and the subscribers' line circuits are idled for future calls.

What is claimed is:

1. In a telephone system; marker apparatus to select paths and establish connections between a first set of terminals and a second set of terminals through a first plurality of switching stages via a plurality of intermediate junctors and a second plurality of switching stages arranged in tandem between terminals of the first set and terminals of the second set, each of said stages comprising a plurality of relays arranged in coordinate arrays, at the coordinate points of each of said arrays, each relay having a normally open set of its own contacts connected in series with its hold winding, there being links interconnecting adjacent stages, a hold conductor interconnecting the series combination of the hold winding and normally open contacts of a relay in each of the adjacent stages, busy links have the hold path contacts closed at each end and having holding current flowing through the hold windings so that a given potential appears on the hold conductor; a plurality of ringing generators, interrupter means having a first means for applying pulses of operating potentials in a time displaced relationship to said plurality of ringing generators; said plurality of intermediate junctors divided into a plurality of groups, each of said plurality of groups of intermediate junctors having connected thereto one of said plurality of ringing generators; said marker apparatus comprising an arrangement for selecting a group of possible links via said second plurality of switching stages for a given connection of said second set of terminals to said intermediate junctors and for connecting the hold conductors thereof to individual inputs of a detecting arrangement, first means in the detecting arrangement to distinguish between the circuit conditions on an idle link and the said potential on a busy link conductor, a plurality of combinational logic gates, a second means in said interrupting means for applying to said logic gates pulses preceding the corresponding pulses from said first means, only said logic gates operated responsive to a non-busy condition of the links in a path from a terminal for said given connection to available junctors that have a pulse from said second means to apply a test potential to said intermediate junctor group corresponding to said ringing generator, means in said junctors effective in an idle condition thereof to pass said test potential through to a test terminal, said marker apparatus further comprising a second arrangement for selecting a group of possible links via said first plurality of switching stages for a given connection and for connecting the hold conductors thereof and said junctor test terminals to individual inputs of a detecting arrangement, means in the detecting arrangement to distinguish between the circuit condition on an idle link and the said potential on a busy link hold conductor, a route selector comprising a scanning arrangement having counting means and coincidence checking means, with connections from the counting means and the detecting arrangement to the coincidence checking means, means to produce a path-found signal from the coincidence checking means responsive to the counting means being in a position corresponding to a path via idle links and an available intermediate junctor as indicated by the presence of a test potential on said test terminal.

2. In a telephone system as claimed in claim 1 with a marker apparatus which includes an arrangement for identifying one terminal of the second set, and an arrangement for defining a group of junctors through which a given connection may be established; wherein each of said stages comprises a plurality of coordinate matrices, with any terminal of the second set connectable through one matrix of a first stage to M first-second stage links extending to M different matrices of a second stage, with each of these M links connectable through the second stage to N second-third stage links so that any terminal of the second set is connectable to M × N second-third stage links, each of which extends to a different third stage matrix, each terminal of said defined group of intermediate junctors being associated with a different one of the third-stage matrices and connectable through it to one of these second-third stage links; means to connect the hold conductors of the M first-second stage links which are connectable to the identified terminal of the second set to individual detector-arrangement inputs, means responsive to the detection of a busy first-second stage link to apply a potential to the hold conductors of the N second-third stage links connectable thereto which is equivalent to the potential on a busy second-third stage link hold conductor, to thereby block the selection of a path including one of these links.

3. In a telephone system as claimed in claim 1 wherein said coincidence checking means in said marker apparatus comprises a number of coincidence gates equal to the number of terminals in said defined group of intermediate junctors, each gate having an input which shows the busy-idle state of one terminal of the defined group, one input which shows the availablity of the corresponding second-third stage link and an input for a corresponding state of the counting means, means including a source of pulses to step the counting means to thereby enable the coincidence gates in turn one at a time until coincidence is found to generate said path-found signal, means responsive to the path-found signal to stop the counting means so that the position of the counting means corresponds to the path found.

4. In a telephone system according to claim 1, wherein said corresponding pulses from said second means precede said pulses from said first means by an amount of time approximating the time required to complete a connection to a telephone line.

5. In a telephone system according to claim 1 further including a control means connected to said scanner means and to said path found output operated upon said scanner completing a scan of available paths via said enabled group of junctors without a signal on said path found output to enable all said logic gates to available junctors.

6. In a telphone system according to claim 1 wherein said marker apparatus is further operated in response to said path found signal to apply a first marking potential to the terminal of the first set and the terminal of the second set and a second marking potential to the terminals of the junctor of the selected path which produces a potential difference in the forward direction of said unidirectional devices between the two selected terminals and said junctors through a series path including the operate winding of one coordinate point relay of each of said stages, which causes said relays in the path between the selected terminals to operate and thereby establish a communication path, a holding circuit being then completed in series through the hold windings and said series contacts of the relays in the established path, and means effective subsequent to the establishment of the holding path for removing said marking potentials and thereby open the operate circuit.

7. Marker apparatus as claimed in claim 1, wherein the number of stages between the first set of terminals and the intermediate junctors is three.

8. Marker apparatus as claimed in claim 1, wherein the number of stages between the second set of terminals and the intermediate junctors is three.

* * * * *